US011055228B2

(12) United States Patent
Wu et al.

(10) Patent No.: US 11,055,228 B2
(45) Date of Patent: Jul. 6, 2021

(54) CACHING BYPASS MECHANISM FOR A MULTI-LEVEL MEMORY

(71) Applicant: Intel Corporation, Santa Clara, CA (US)

(72) Inventors: Wei Wu, Portland, OR (US); Zhe Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 16/264,615

(22) Filed: Jan. 31, 2019

(65) Prior Publication Data

US 2019/0163639 A1    May 30, 2019

(51) Int. Cl.
*G06F 12/08* (2016.01)
*G06F 12/0888* (2016.01)

(52) U.S. Cl.
CPC .. *G06F 12/0888* (2013.01); *G06F 2212/1024* (2013.01); *G06F 2212/1044* (2013.01)

(58) Field of Classification Search
None
See application file for complete search history.

(56) References Cited

U.S. PATENT DOCUMENTS

| | | |
|---|---|---|
| 5,912,839 A | 6/1999 | Ovshinsky et al. |
| 6,035,432 A | 3/2000 | Jeddeloh |
| 6,292,874 B1 | 9/2001 | Barnett |
| 7,590,918 B2 | 9/2009 | Parkinson |
| 7,600,078 B1 | 10/2009 | Cen et al. |
| 7,756,053 B2 | 7/2010 | Thomas et al. |
| 7,774,556 B2 | 8/2010 | Karamcheti et al. |
| 7,913,147 B2 | 3/2011 | Swaminathan et al. |
| 8,051,253 B2 | 11/2011 | Okin et al. |
| 8,462,537 B2 | 6/2013 | Karpov et al. |
| 8,462,577 B2 | 6/2013 | Zeng et al. |
| 8,463,948 B1 | 6/2013 | Qawami et al. |
| 8,605,531 B2 | 12/2013 | Kau |
| 8,607,089 B2 | 12/2013 | Qawami et al. |
| 8,612,676 B2 | 12/2013 | Dahlen et al. |
| 8,612,809 B2 | 12/2013 | Casper et al. |
| 8,626,997 B2 | 1/2014 | Qawami et al. |
| 8,649,212 B2 | 2/2014 | Kau et al. |

(Continued)

FOREIGN PATENT DOCUMENTS

| | | |
|---|---|---|
| CN | 1100540 A | 3/1995 |
| CN | 101079003 A | 11/2007 |

(Continued)

OTHER PUBLICATIONS

Run-time Adaptive Cache Hierarchy Management via Reference Analysis, by Johnson et al. (Year: 1997).*

(Continued)

*Primary Examiner* — Tracy C Chan
(74) *Attorney, Agent, or Firm* — Compass IP Law PC

(57) ABSTRACT

An apparatus is described. The apparatus includes memory controller logic circuitry to interface to a multi-level memory having a higher memory level to act as a memory side cache for a lower memory level. The memory controller logic circuitry having policy determination circuitry to prevent lesser accessed data items from occupying space in the higher memory level at the expense of more frequently accessed data items.

10 Claims, 13 Drawing Sheets

(56) References Cited

U.S. PATENT DOCUMENTS

| | | |
|---|---|---|
| 8,838,935 B2 | 9/2014 | Hinton et al. |
| 9,087,584 B2 | 7/2015 | Dahlen et al. |
| 9,317,429 B2 | 4/2016 | Ramanujan et al. |
| 9,342,453 B2 | 5/2016 | Nale et al. |
| 9,378,133 B2 | 6/2016 | Nachimuthu et al. |
| 9,378,142 B2 | 6/2016 | Ramanujan et al. |
| 9,430,372 B2 | 8/2016 | Nachimuthu et al. |
| 9,529,708 B2 | 12/2016 | Puthiyedath et al. |
| 9,600,407 B2 | 3/2017 | Faber |
| 9,600,416 B2 | 3/2017 | Ramanujan et al. |
| 9,619,408 B2 | 4/2017 | Nale et al. |
| 9,690,493 B2 | 6/2017 | Dahlen et al. |
| 2005/0273584 A1 | 12/2005 | Wisecup et al. |
| 2007/0005922 A1 | 1/2007 | Swaminathan et al. |
| 2007/0255891 A1 | 11/2007 | Chow et al. |
| 2008/0016269 A1 | 1/2008 | Chow et al. |
| 2008/0034148 A1 | 2/2008 | Gower et al. |
| 2008/0082766 A1 | 4/2008 | Okin et al. |
| 2008/0235443 A1 | 9/2008 | Chow et al. |
| 2008/0270811 A1 | 10/2008 | Chow et al. |
| 2009/0119498 A1 | 5/2009 | Narayanan |
| 2009/0313416 A1 | 12/2009 | Nation |
| 2010/0110748 A1 | 5/2010 | Best |
| 2010/0131827 A1 | 5/2010 | Sokolov et al. |
| 2010/0291867 A1 | 11/2010 | Abdulla et al. |
| 2010/0293317 A1 | 11/2010 | Confalonieri et al. |
| 2010/0306446 A1 | 12/2010 | Villa et al. |
| 2010/0306453 A1 | 12/2010 | Doller |
| 2010/0318718 A1 | 12/2010 | Eilert et al. |
| 2011/0047365 A1 | 2/2011 | Hentosh et al. |
| 2011/0060869 A1 | 3/2011 | Schuette |
| 2011/0153916 A1 | 6/2011 | Chinnaswamy et al. |
| 2011/0208900 A1 | 8/2011 | Schuette et al. |
| 2011/0291884 A1 | 12/2011 | Oh et al. |
| 2012/0212332 A1* | 8/2012 | Schubert ............... H01R 13/66 340/12.32 |
| 2013/0212332 A1* | 8/2013 | Umamageswaran ........................ G06F 16/24552 711/130 |
| 2013/0268741 A1 | 10/2013 | Daly et al. |
| 2013/0275661 A1 | 10/2013 | Zimmer et al. |
| 2013/0282967 A1 | 10/2013 | Ramanujan |
| 2013/0290597 A1 | 10/2013 | Faber |
| 2014/0129767 A1 | 5/2014 | Ramanujan et al. |
| 2014/0297938 A1 | 10/2014 | Puthiyedath et al. |
| 2015/0026403 A1* | 1/2015 | Ish ...................... G06F 12/0868 711/118 |
| 2017/0031821 A1 | 2/2017 | Ramanujan et al. |
| 2017/0139649 A1 | 5/2017 | Puthiyedath et al. |
| 2017/0249250 A1 | 8/2017 | Ramanujan et al. |
| 2017/0249266 A1 | 8/2017 | Nale et al. |
| 2017/0371795 A1* | 12/2017 | Wang .................. G06F 12/0873 |

FOREIGN PATENT DOCUMENTS

| | | |
|---|---|---|
| CN | 101620539 A | 12/2013 |
| WO | 2005002060 A2 | 1/2005 |

OTHER PUBLICATIONS

"Phase change memory-based 'moneta' system points to the future of computer storage", ScienceBlog, Jun. 2, 2011, 7 pgs.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

Akel et al., "Onyx: A Prototype Phase Change Memory Storage Array," https://www.flashmemorysummit.com/English/Collaterals/Proceedings/2011/Pr- oceedings.sub.--Chrono.sub.--2011.html, Flash Memory Summit 2011 Proceedings, Aug. 11, 2011.

Bailey et al., "Operating System Implications of Fast, Cheap, Non-Volatile Memory" 13th USENIX, HOTOS11 2011, May 9-11, 2011, 5 pages.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

Chen et al., "Rethinking Database Algorithms for Phase Change Memory", 5th Biennial Conference on Innovative Data Systems Research {CIDR '11 }, Jan. 9, 2011, 11 pgs., Asilomar, California, USA.

Condit et al., "Better I/O Through Byte-Addressable, Persistent Memory", SOSP '09, Oct. 11, 2009, pp. 133-146. Big Sky, Montana, USA.

Dhiman, et al. "pdram: a Hybrid PRAM and DRAM Main Memory System", Jul. 26, 2009, Department of Computer Science and Engineering, 6 pages.

Freitas et al., "Storage-class memory: The next storage system technology", IBM J. Res. & Dev., Jul./Sep. 2008, pp. 439-447, vol. 52, No. 4/5.

Jacob, "The Memory System You Can't Avoid it, You Can't Ignore it, You Can't Fake it," Morgan & Claypool, Synthesis Lectures on Computer Architecture, vol. 4, No. 1, pp. 1-77, Jun. 2009.

Jain, et al., "Back to the Future: Leveraging Belady's Algorithm for Improved Cache Replacement", Proceedingsof the 43rd International Symposium on Computer Architecture (ISCA '16), IEEE Press, Piscataway, NJ, USA pp. 78-79.

Kant, Dr. Krishna, "Exploiting NVRAM for Building Multi-Level Memory Systems", InernationalWorkshop on Operating System Technologies for Large Scale NVRAM, Oct. 21, 2008, Jeju, Korea, 19 pages.

Lee et al., "Architecting Phase Change Memory as a Scalable DRAM Alternative", ISCA '09 Proceedings of the 36th Annual International Symposium on Computer Architecture, pp. 2-13, Jun. 20-24, 2009.

Mearian, "IBM announces computer memory breakthrough Phase-change memory offers 100 times the write performance of NANO flash", Jun. 30, 2011, 3 pgs.

Mogul et al., "Operating System Support for NVM+DRAM Hybrid Main Memory", 12th Workshop on Hot Topics in Operating Systems {HatOS XII), May 18, 2009, 9 pgs.

Quereshi et al., "Scalable High Performance Main Memory System Using Phase-Change Memory Technology", ISCA '09, Jun. 20, 2009, 10 pgs., Austin, Texas, USA.

Raoux et aL, "Phase-Change Random Access Memory: A Scalable Technology," IBM Journal of Research and Development, vol. 52, Issue 4, pp. 465-479, Jul. 2008.

Wu et al., "eNVy: A Non-Volatile, Main Memory Storage System," ASPLOS VI Proceedings of the Sixth International Conference on Architectural Support for Programming Languages and Operating Systems, 12 pages, Oct. 1994.

Young, et al., "ACCORD: Enabling Associativity for Gigascale DRAM Caches by Coordinating Way-Install and Way-Prediction", 2018 ACM/IEEE 45th Annual International Symposium on Computer Architecture (ISCA), Los Angeles, CA, USA, 2018, pp. 328-339.

* cited by examiner

CACHING BYPASS MECHANISM FOR A MULTI-LEVEL MEMORY

FIELD OF INVENTION

The field of invention pertains generally to the computing sciences, and, more specifically, to a Caching Bypass Mechanism For a Multi-Level Memory.

BACKGROUND

A pertinent issue in many computer systems is the system memory (also referred to as "main memory"). Here, as is understood in the art, a computing system operates by executing program code stored in system memory and reading/writing data that the program code operates on from/to system memory. As such, system memory is heavily utilized with many program code and data reads as well as many data writes over the course of the computing system's operation. Finding ways to improve system memory accessing performance is therefore a motivation of computing system engineers.

FIGURES

A better understanding of the present invention can be obtained from the following detailed description in conjunction with the following drawings, in which.

DETAILED DESCRIPTION

Figure 1:
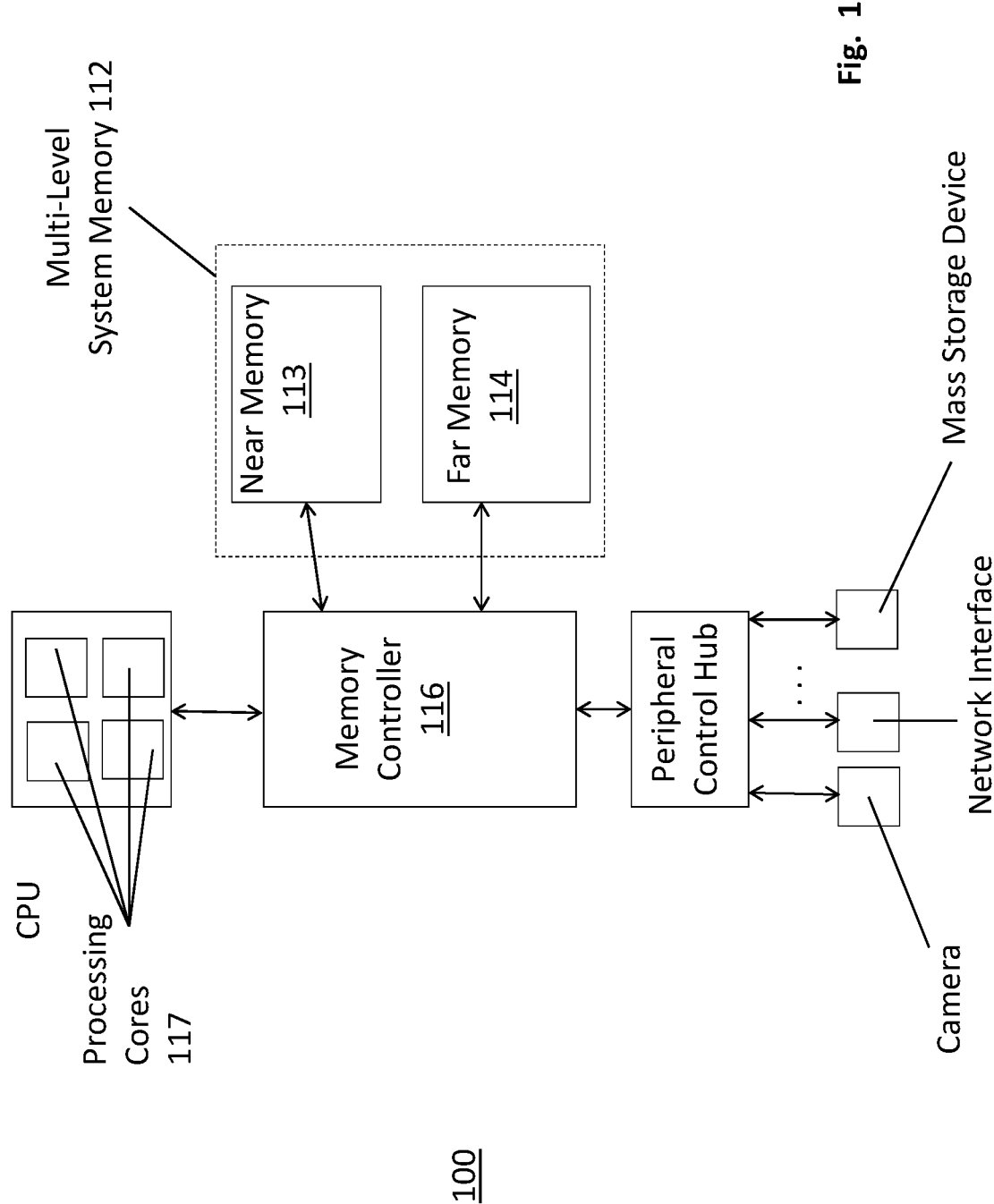
FIG. 1 shows a 2LM memory system.

FIG. 1 shows an embodiment of a computing system 100 having a multi-tiered or multi-level system memory 112. According to various embodiments, a smaller, faster near memory 113 may be utilized as a cache for a larger, slower far memory 114. In various embodiments, near memory 113 is used to store the more frequently accessed items of program code and/or data that are kept in system memory 112. By storing the more frequently used items in near memory 113, the system memory 112 will be observed as faster because the system will often read/write from/to items that are being stored in faster near memory 113.

According to various embodiments, near memory 113 has lower access times than the lower tiered far memory 114 For example, the near memory 113 may exhibit reduced access times by having a faster clock speed than the far memory 114. Here, the near memory 113 may be a faster (e.g., lower access time), volatile system memory technology (e.g., high performance dynamic random access memory (DRAM) and/or SRAM memory cells) co-located with the memory controller 116. By contrast, far memory 114 may be either a volatile memory technology implemented with a slower clock speed (e.g., a DRAM component that receives a slower clock) or, e.g., a non volatile memory technology that is slower (e.g., longer access time) than volatile/DRAM memory or whatever technology is used for near memory.

In the case of the later, far memory 114 may be comprised of an emerging non volatile random access memory technology such as, to name a few possibilities, a phase change based memory, a three dimensional crosspoint memory having non volatile storage cells, "write-in-place" non volatile main memory devices, memory devices having storage cells composed of chalcogenide, multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc. Any of these technologies may be byte addressable so as to be implemented as a system memory in a computing system (also referred to as a "main memory") rather than traditional block or sector based non volatile mass storage.

Emerging non volatile random access memory technologies typically have some combination of the following: 1) higher storage densities than DRAM (e.g., by being constructed in three-dimensional (3D) circuit structures (e.g., a crosspoint 3D circuit structure integrated in the metal wiring above the substrate of a semiconductor chip)); 2) lower power consumption densities than DRAM at least while idling (e.g., because they do not need refreshing); and/or, 3) access latency that is slower than DRAM yet still faster than traditional non-volatile memory technologies such as FLASH. The latter characteristic in particular permits various emerging non volatile memory technologies to be used in a main system memory role rather than a traditional mass storage role (which is the traditional architectural location of non volatile storage).

Regardless of whether far memory 114 is composed of a volatile or non volatile memory technology, in various embodiments far memory 114 acts as a true system memory in that it supports finer grained data accesses (e.g., cache lines) rather than only larger based "block" or "sector" accesses associated with traditional, non volatile mass storage (e.g., solid state drive (SSD), hard disk drive (HDD)), and/or, otherwise acts as a byte addressable memory that the program code being executed by processor(s) of the CPU operate out of.

In various embodiments, system memory may be implemented with dual in-line memory modules (DIMMs) where a single DIMM has both volatile (e.g., DRAM) and (e.g., emerging) non volatile memory semiconductor chips disposed on it. In other configurations DIMMs having only DRAM chips may be plugged into a same system memory channel (e.g., a double data rate (DDR) channel) with DIMMs having only non volatile system memory chips.

In another possible configuration, a memory device such as a DRAM device functioning as near memory 113 may be assembled together with the memory controller 116 and processing cores 117 onto a single semiconductor device (e.g., as embedded DRAM) or within a same semiconductor package (e.g., stacked on a system-on-chip that contains, e.g., the CPU, memory controller, peripheral control hub, etc.). Far memory 114 may be formed by other devices, such as slower DRAM or emerging non-volatile memory and may be attached to, or integrated in the same package as well. Alternatively, far memory may be external to a package that contains the CPU cores. A far memory controller may also exist between the host side main memory controller and far memory devices. The far memory controller may be integrated within a same semiconductor chip package as CPU cores and the host side main memory controller, or, may be located outside such a package (e.g., by being integrated on a DIMM having far memory devices).

In various embodiments, at least some portion of near memory 113 has its own system address space apart from the system addresses that have been assigned to far memory 114 locations. In this case, the portion of near memory 113 that has been allocated its own system memory address space acts, e.g., as a higher priority level of system memory (because it is faster than far memory). In further embodiments, some other portion of near memory 113 (or all of near memory) may also act as a memory side cache (that caches the most frequently accessed items from main memory (which may service more than just the CPU core(s) such as a GPU, peripheral, network interface, etc.) or last level CPU cache (which only services CPU core(s)).

In the case where near memory 113 acts as a "memory side" cache for far memory 114, the near memory 113 may be used slightly differently than a CPU level cache in that the entries (e.g., cache lines) of data that are more frequently written to and/or read from system memory 112 are present in near memory 113, whereas, in the case of a CPU level cache, entries of data that are more frequently written to and/or read by the processing cores/CPU 117 are present in a CPU level cache (computing systems often have multiple levels of CPU caches where cache lines that are most frequently accessed by the cores/CPU 117 are kept in the highest level CPU caches while lesser accessed cache lines are kept in lower level CPU caches).

The distinction between a memory side cache and a CPU level cache is particularly noticeable if the computing system includes components other than the cores/CPU 117 that heavily use system memory (e.g., a graphics processor). Conceivably, some or all of near memory 113 could be used to implement a last level CPU cache. Different types of near memory caching architectures are possible (e.g., direct mapped, set associative, etc.). Additionally, near memory may act as a memory side cache for more than one lower level of the multi-level memory (and not just a single far memory level).

According to nominal read/write behavior, in the case of a read, first, a determination is made as to whether or not the targeted cache line is in near memory 113. If so (cache hit), the cache line is read from near memory 113 and sent to the requestor. If not (cache miss), the cache line is read from far memory 114, sent to the requester and then written into near memory 113. In the case of a write, first, a determination is made as to whether or not the targeted cache line is in near memory 113. If so (cache hit), the cache line is read from near memory 113, updated with the new information and then written back to near memory 113. If not (cache miss), the cache line is read from far memory 114, updated with the new information and then written into near memory 113. Notably, according to the above scheme, a cache line is always written into near memory after it has just been used to service a request.

A potential issue with a multi-level system memory having a near memory and a far memory as described above is that some cache lines that map to a particular cache line slot in the near memory may be more frequently used than other cache lines that map to the same cache line slot. Consider a scenario where a more frequently used cache line is resident in a near memory cache line slot and a read request is received for a less frequently used cache line slot that maps to the same cache line slot.

Consistent with the above discussion, the request suffers a miss in the near memory. As such, in the case of the read, the requested cache line is fetched from far memory, provided to the requestor and written into the near memory cache line slot.

Unfortunately, a lesser used cache line will reside in near memory after the read process is complete. It is altogether possible, conceivably even likely depending on the precise environment, that the next received request that maps to the cache line slot will target the more frequently used cache line that was just evicted from the cache line slot in favor of the lesser used cache line that was just targeted. As such, the system will again have to endure the cache miss procedure described above just to re-insert the more frequently used cache line back into the cache line slot.

Figure 2:
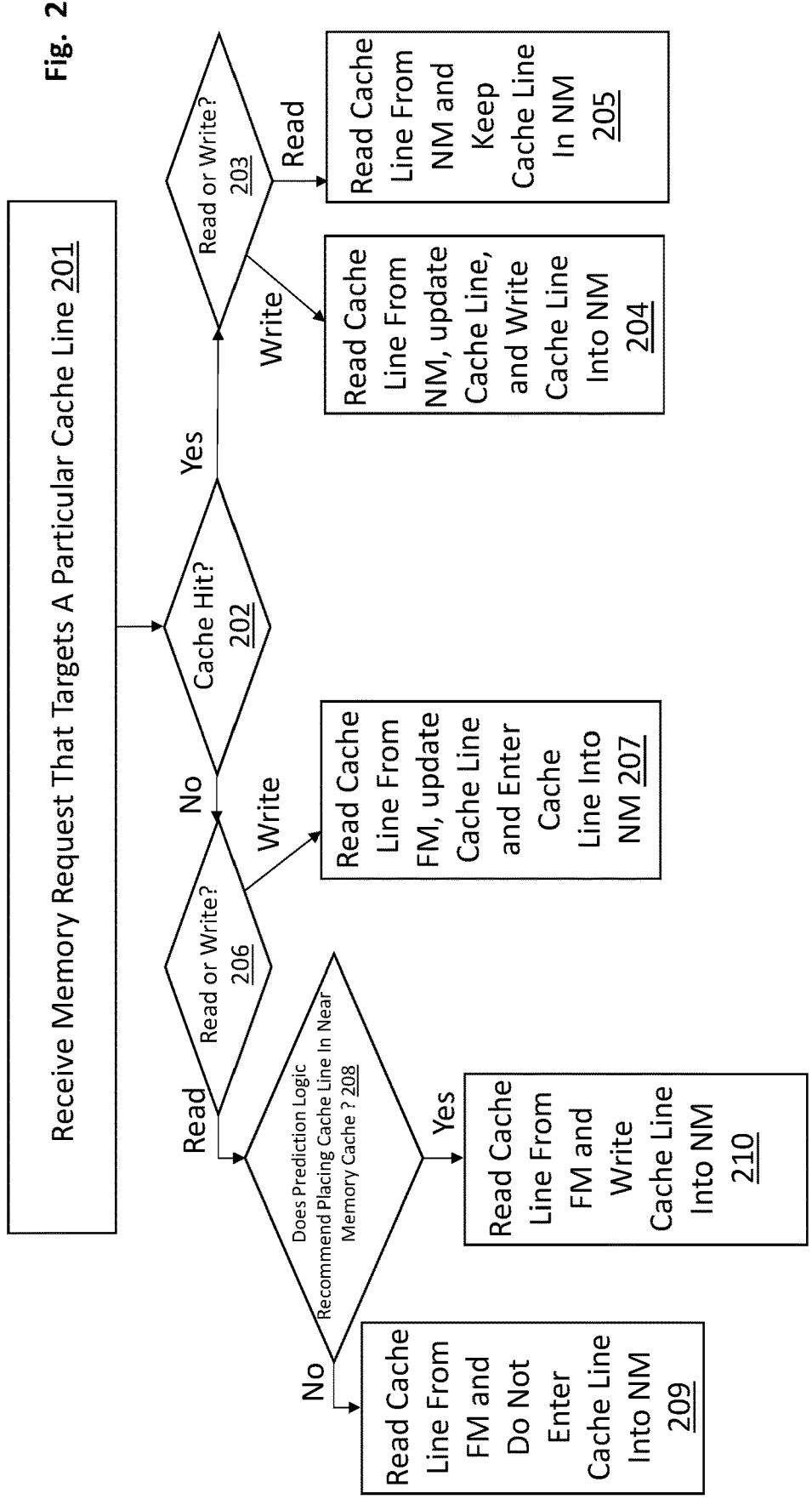
FIG. 2 shows an improved method for using a 2LM memory system.

A better solution, as observed in the program flow of FIG. 2, is to incorporate some kind of prediction technology 202 into the read miss procedure so that, e.g., a more frequently used cache line is not evicted from near memory by a less frequently used cache line. As such, a more frequently used cache line can remain in the cache after completion of a read request that targets a lesser used cache line that maps to the same cache line slot.

According to one embodiment, observed in FIG. 2, a prediction is used to determine the cache content only in the case of a cache miss of a read request. That is, in the case of a cache hit 202, 203, the targeted cache line remains in near memory for both write requests 204 and read requests 205. Likewise, in the case of a cache miss 202 and a write request 206, the targeted cache line, after being read from far memory and updated with the new write information is written into the cache as per normal processing 207.

However, in the case of a cache miss 202 and a read request 206, an inquiry 208 is made as to whether the cache line that is targeted by the newly received read request is more frequently used or less frequently used than other cache lines that map to the same cache line slot(s).

If the cache line targeted by the newly received read request is a less frequently used cache line, the targeted cache line is read from far memory but not written into the near memory cache as part of its request handling 209. By contrast, if the cache line targeted by the newly received read request is a more frequently used cache line, the targeted cache line is read from far memory and then written into the near memory cache as part of its request handling 210 (that is, the nominal read request process in the case of a cache miss is followed) 208.

Here, cache hits do not trigger a prediction because the principle of temporal locality imparts a somewhat higher likelihood that the targeted cache line could again be targeted on the next received request that maps to the same cache line slot. Writes in the case of a cache miss also do not trigger a prediction for similar reasons (there is a somewhat higher likelihood that the targeted cache line could again be targeted on the next received request that maps to the same cache line slot).

By contrast, in the case of a cache miss 202 and a read request 206, the request handling process is enhanced to prevent the eviction of more frequently used cache lines from near memory in favor of less frequently used cache lines where the more frequently used cache lines and the less frequently used cache lines compete for same cache resources (same cache line slot(s)).

In various embodiments, in order to implement the prediction function 201, some kind of prior history record of the addresses of the requests that map to a same cache line slot in near memory is maintained and an algorithm is applied to the prior history data to determine whether the cache line associated with a most recent request should, or should not, be written into near memory.

Figure 3:
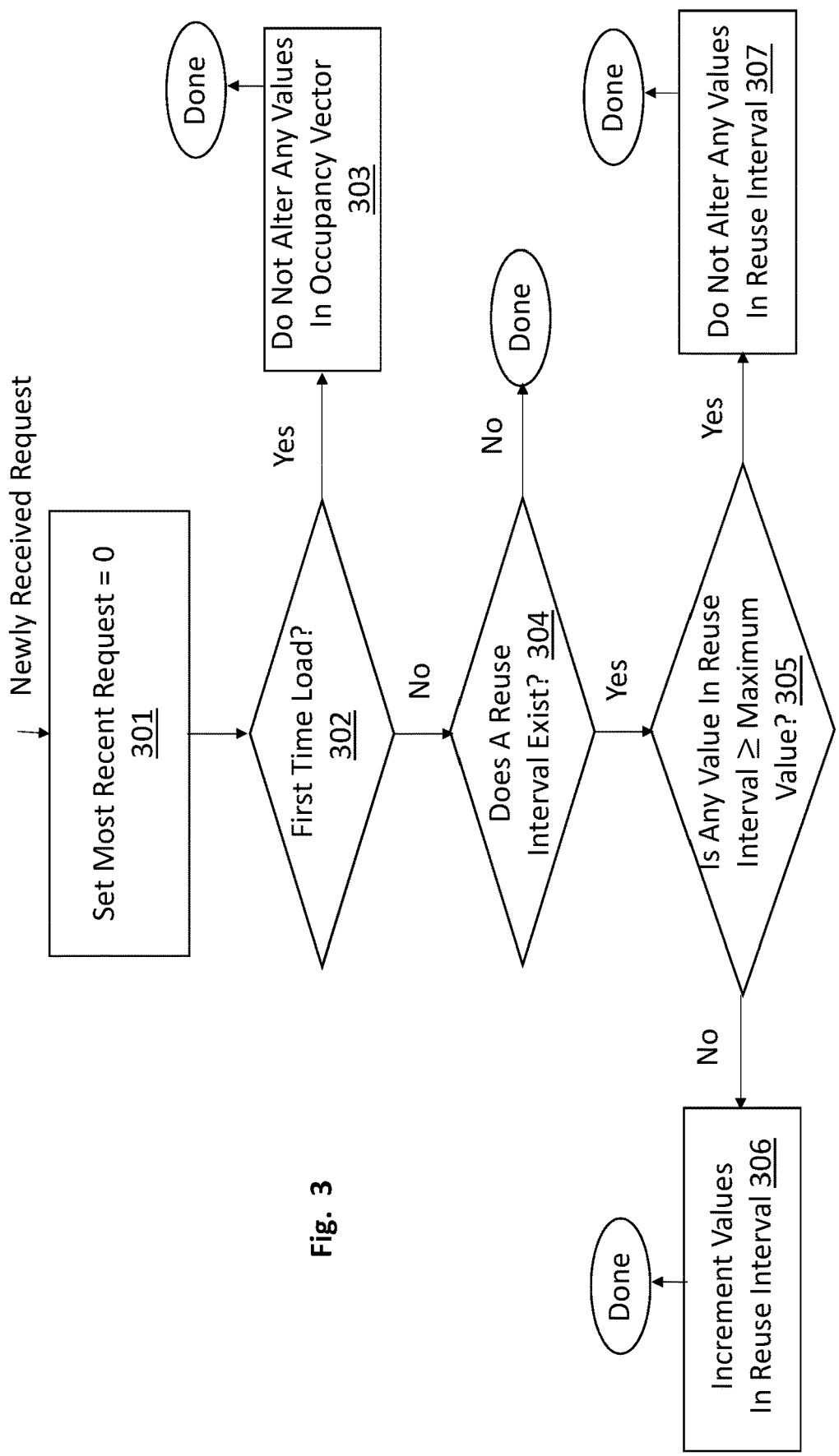
FIG. 3 shows a prediction methodology.

FIG. 3 provides an overview of the prediction algorithm and FIGS. 4a through 4h provide a working example of the algorithm's execution on a prior history record. As observed in FIG. 4a, the prior history record is implemented as an occupancy vector 401. The elements of the occupancy vector 401 correspond to the cache lines (which are uniquely identified by their respective system memory addresses) that were targeted by the most recently received memory requests and that map to a same cache line slot that the occupancy vector 401 keeps a prior history on behalf of. In the particular embodiment of FIGS. 4a through 4h, as will become more evident in the following discussion, the occupancy vector 401 keeps a record of the four most recently received requests 400 with one bit per request. As such the occupancy vector 401 is a four bit vector.

According to the numerical theory of the algorithm, each element location in the occupancy vector 401 corresponds to a particular cache line (e.g., identified by its system memory address) that has been received over the past four requests. When a next request is received, a bit that represents the request's targeted cache line is entered as the right most bit of the vector's data. Any other bits that are already in the vector shift to the left (to make room for the new bit). After three more requests, the bit that represented the aforementioned cache line will have been shifted into the left most bit position of the vector 401.

Upon receipt of the next request, the bit will be shifted out of the vector 401 and the algorithm will formally render a recommendation 402 as to whether or not this particular cache line should be written into near memory cache the next time a request is received that targets the cache line. As described more thoroughly below, the algorithm can change the bits in the vector 401 based on the address of a newly received cache line, and, can also change its recommendation as to whether or not a cache line is recommended for inclusion in near memory cache based on the vector's bit values.

Although the occupancy vector 401 of the particular example of FIGS. 4a through 4h represents a prior history of four cache lines with a single bit per cache line, more generally, the maximum value of each element location in the occupancy vector 401 corresponds to the "capacity" in near memory that could store the cache line in near memory. Thus, in the particular example of FIGS. 4a through 4h, near memory is assumed, e.g., to be a direct mapped cache (each system memory address maps to only one cache line slot in near memory cache), and, the maximum "capacity" for each cache line is a 1.

In other embodiments where a system memory address can map to more than one cache line slot in near memory cache, e.g., if near memory cache is implemented as a set associative cache, the elements in the occupancy vector would be multi-bit values each having a maximum value that corresponds to the maximum number of sets or slots that a system memory address can map to. For simplicity the remainder of the example will assume a direct mapped cache and representation of a cache line in the occupancy vector with only a single bit per cache line.

In an embodiment, the values of the bits in the occupancy vector 401 are determined by a set of four rules as provided below. The overall methodology is presented in FIG. 3.

Rule 1. The cache line of the most recently received request is represented 301 by a 0. As such, each entry of "new bit" to the right hand side of the vector is a 0.

Rule 2. If the system address of a newly received request has not previously been observed to map to the cache line slot ("first time load"), no other bit values in the occupancy vector change as a consequence of the request's targeted cache line's bit being newly entered to the occupancy vector 302, 303 (where such bit is entered as a 0 according to Rule 1). Note that Rule 2 causes the near memory controller to keep a record of the addresses of prior requests.

Rule 3 or Rule 4 is applicable if the system address of a newly received request has previously been observed 303 (it is not a first time load) and reuse interval exists 304 (described below). In this case, bit values in the occupancy vector 401 can change as a consequence of the newly received request's cache line's bit being newly entered to the occupancy vector 401 (where, again, such bit is entered as a 0 according to Rule 1).

Rule 3. If all vector elements in a "reuse interval" are smaller than the maximum permissible vector element value (the aforementioned "capacity" which in the present example is 1), all elements in the reuse interval are incremented 305, 306 to a 1. The reuse interval is a contiguous subset of bits in the vector that include, on its left end, the oldest bit value in the vector that corresponds to the same cache line as the cache line targeted by the most recently received request, and, on its right end, the second to rightmost bit in the vector (that is, the reuse interval extends from the oldest to newest bits in the vector to represent the cache line, and, includes the oldest bit but does not include the newest bit). Additionally, the oldest bit in the reuse interval is marked with a prediction recommendation that the cache line should be included in the near memory cache (the prediction algorithm recommends that the cache line should be entered in the near memory cache rather than not entered in near memory cache).

Rule 4. If at least one vector element in the reuse interval has reached or exceeded the maximum permissible vector element value, no change is made to any of the values in the reuse interval 305, 307. Additionally, the oldest bit in the reuse interval is marked with the recommendation that the cache line should not be included in the near memory cache (the predictor recommends that the cache line should not be entered in the near memory cache rather than entered in near memory cache).

FIGS. 4a through 4h depict a simple example where an initial sequence of requests that map to a particular cache line slot have exhibit alternating system memory addresses A, B, A, B.

Figure 4A:
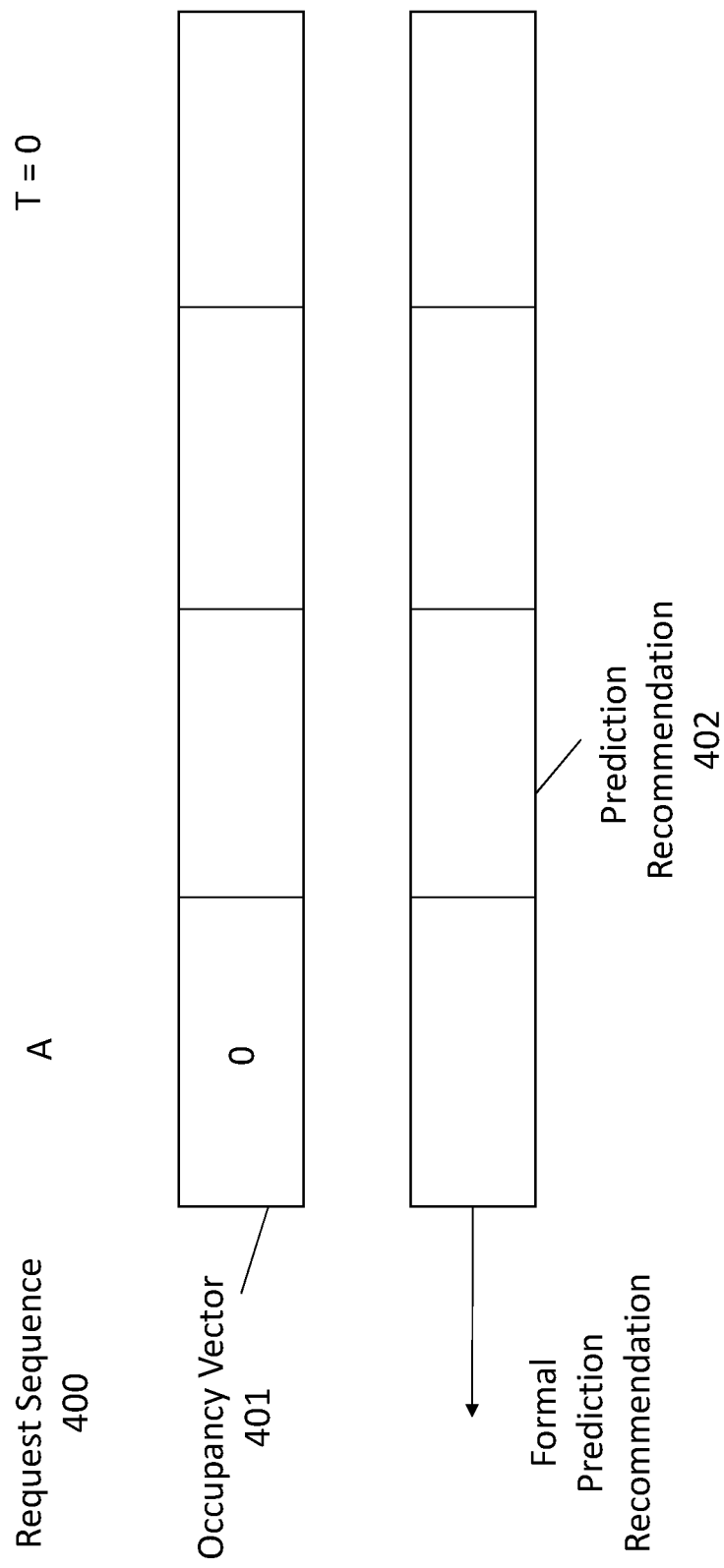
FIGS. 4a through 4h show a working example of the prediction methodology of FIG. 3.

As observed in FIG. 4a, at time T=0, the first request to map to the cache line slot has system memory address A. As such, according to Rule 1 (and Rule 2), a bit that represents the cache line having system memory address A is entered at the right most position of the vector's data having value 0 (since this is the first entry in the vector overall the vector is a single element vector as of time T=0).

Figure 4B:
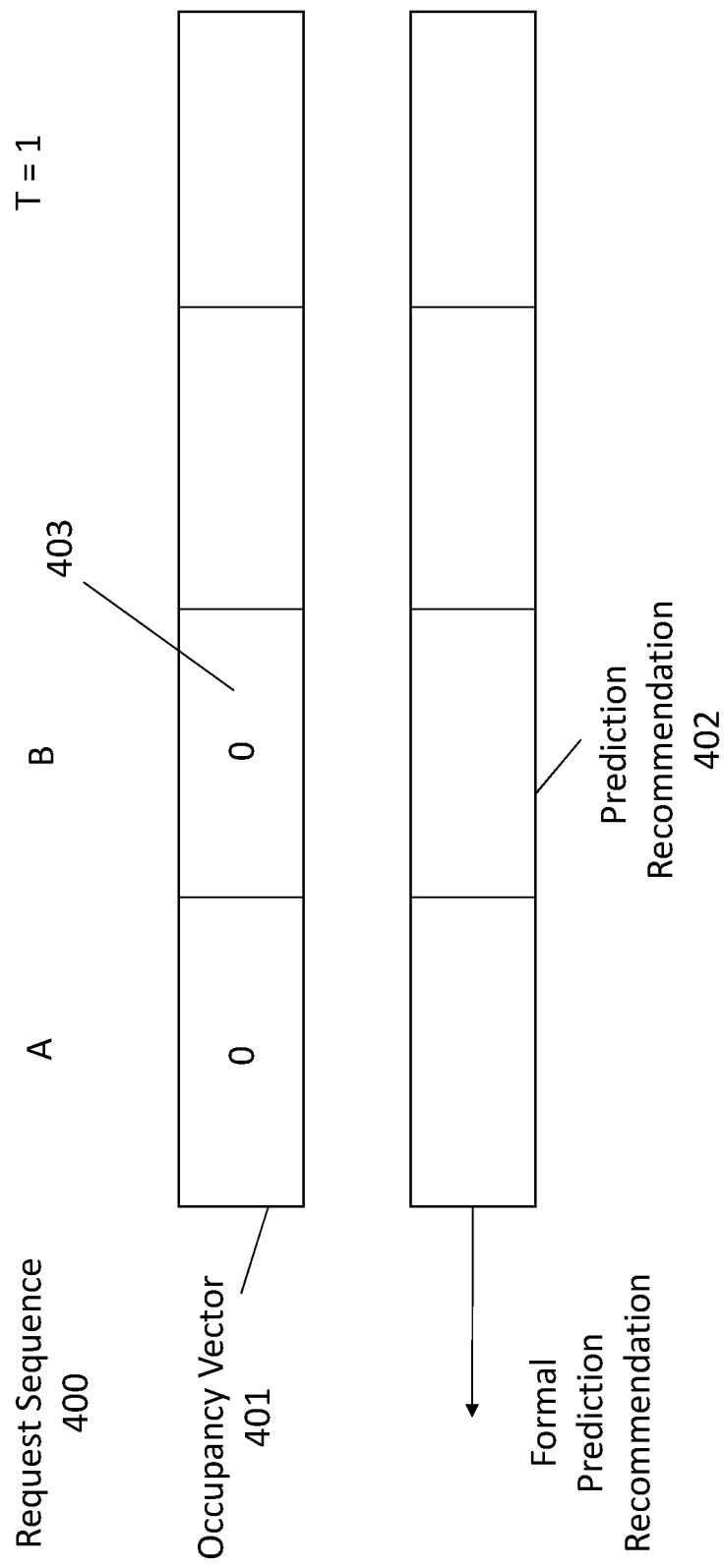

As observed in FIG. 4b, at time T=1, the second request to map to the cache line slot has system memory address B. As such, according to Rule 1 (and Rule 2), a bit that represents the cache line having system memory address B is entered at the rightmost position 403 of the vector's data having value 0.

Figure 4C:
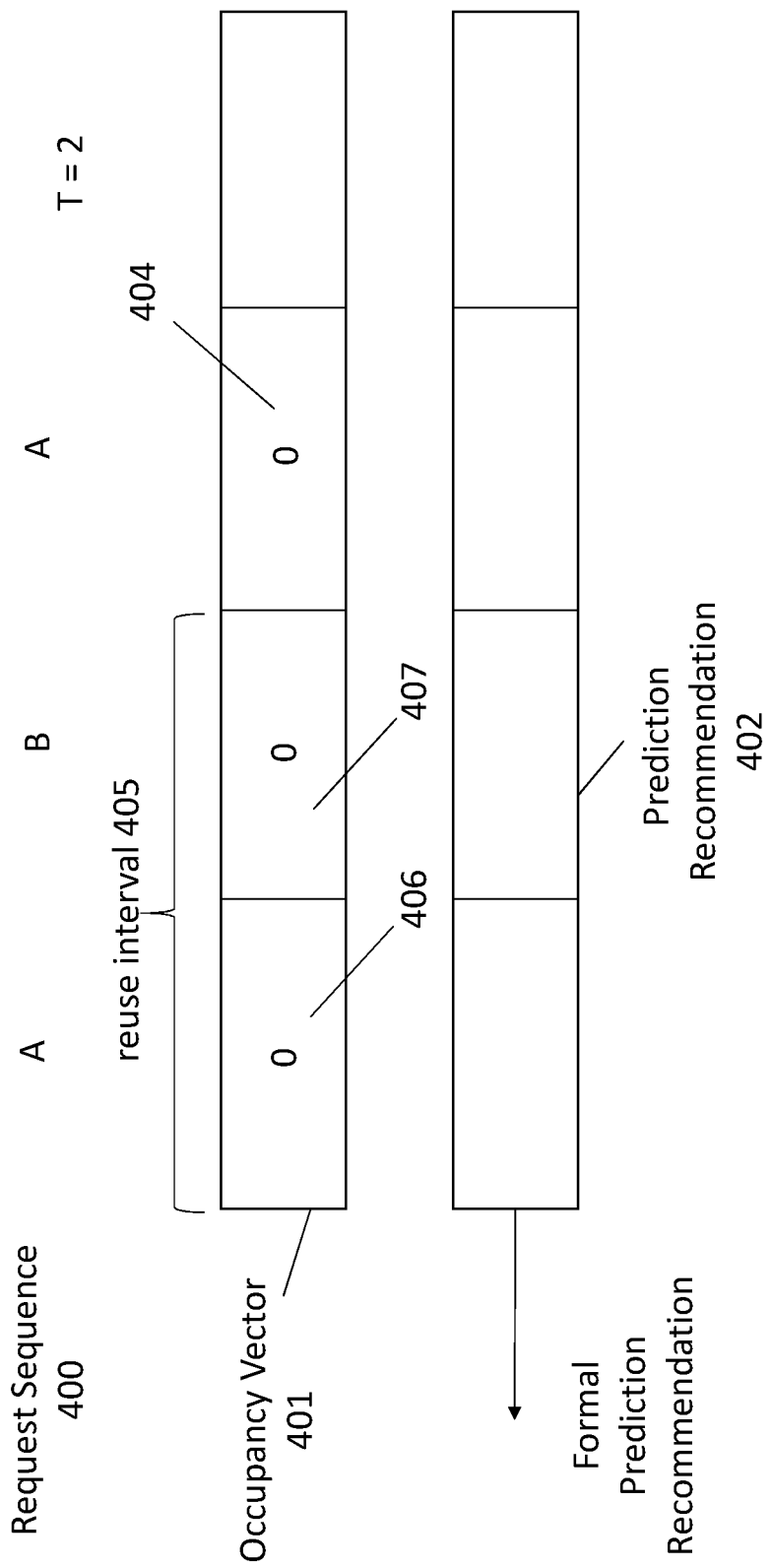
Figure 4D:
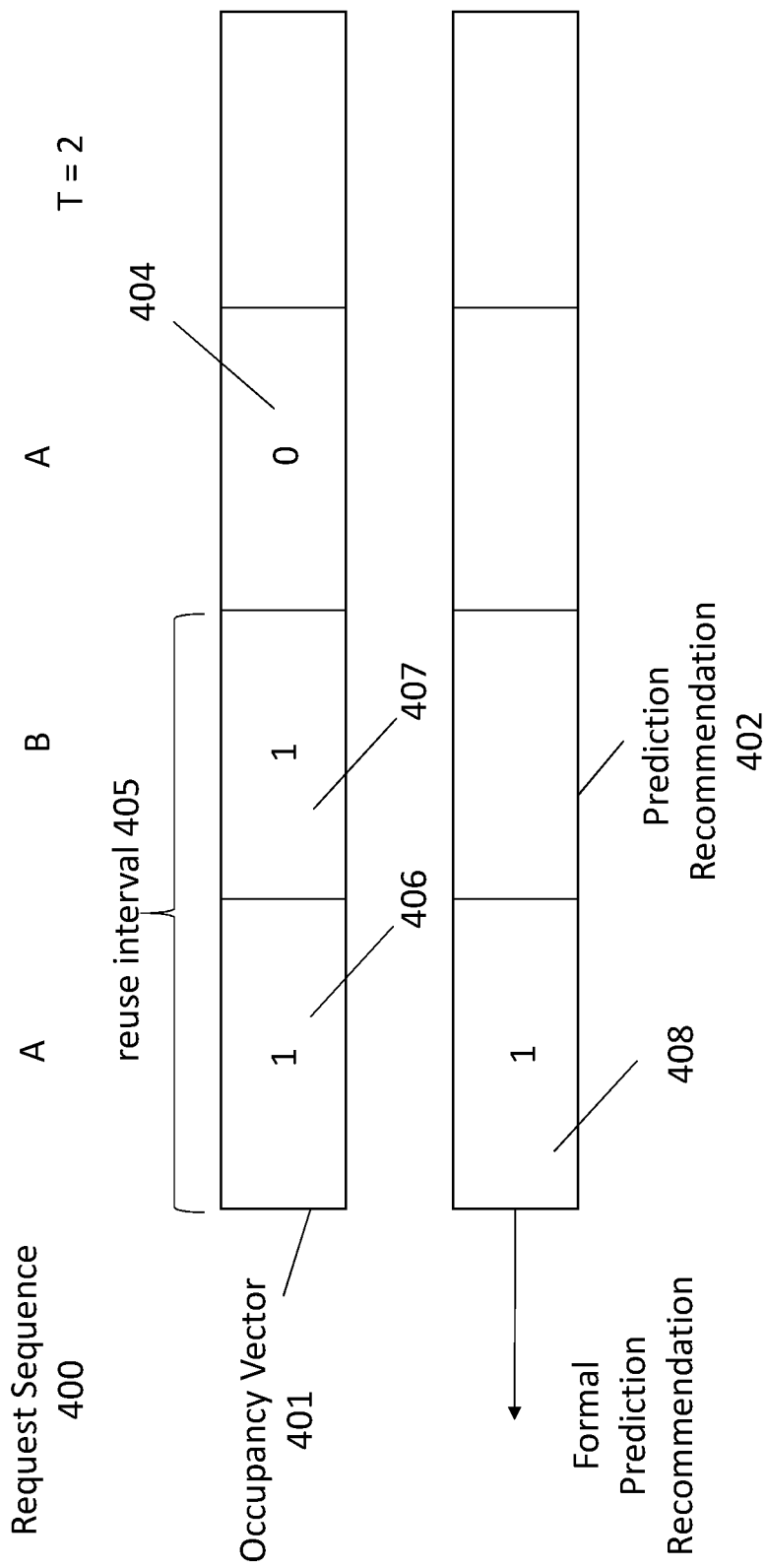

As observed in FIG. 4c, at time T=2, another request is received that maps to the cache line slot and has address A. A bit of value 0 that represents this request is entered on the right hand side 404 of the vector's data according to Rule 1. A reuse interval 405 also exists because the leftmost bit 406 also represents this same cache line. The reuse interval 405 includes the leftmost bit 406 and the middle bit 407 (that represents the cache line having address B) but not the rightmost bit 404 (the newest entry for the cache line having address A). As such, as observed in FIG. 4d, according to Rule 3, both the leftmost and middle bits (the bits in the reuse interval 405) are incremented to a value of 1 because both bits have a value in FIG. 4c that is less than the maximum value permitted for a vector element. The prediction algorithm also appends the leftmost bit with a recommendation 408 to keep this cache line (having address A) in the near memory cache.

Figure 4E:
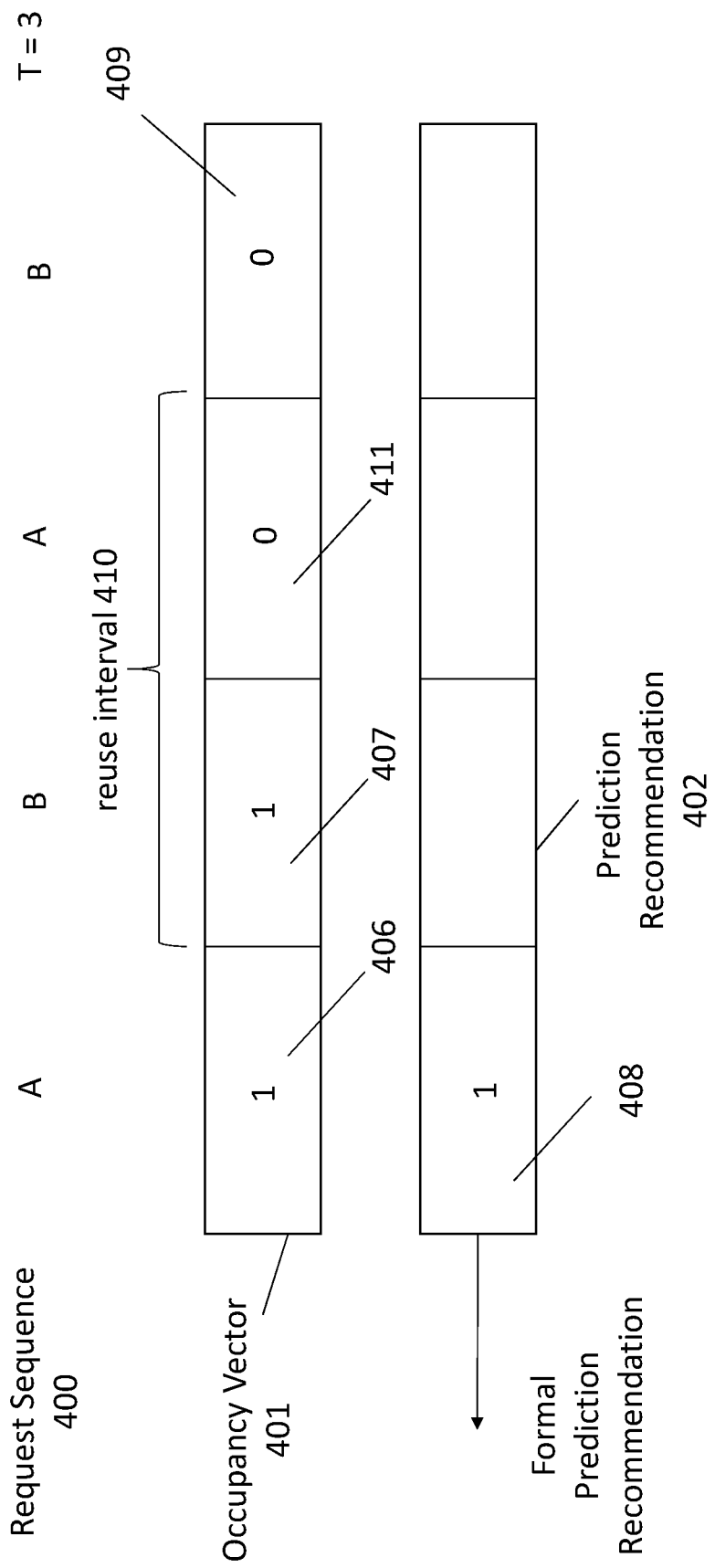

As observed in FIG. 4e, at time T=3, another request is received that maps to the cache line slot and has address B. A bit of value 0 that represents this request is entered on the right hand side of the vector 409 according to Rule 1. A reuse interval 410 also exists because the second to leftmost bit 407 also represents this same cache line. The reuse interval 410 includes the second leftmost bit 407 and the second rightmost bit 411 (that represents the cache line having address A) but not the rightmost bit 409 (the newest entry for the cache line having address B). As observed in FIG. 4f, according to Rule 4, both bits 407, 411 in the reuse interval 410 remain unchanged because the leftmost bit 407 has a value that has reached the maximum value permitted for a vector element. The prediction recommendation algorithm therefore sets the cache line having address B (which bit 407 corresponds to) with a recommendation 412 that it should not be placed in the near memory cache.

Figure 4F:
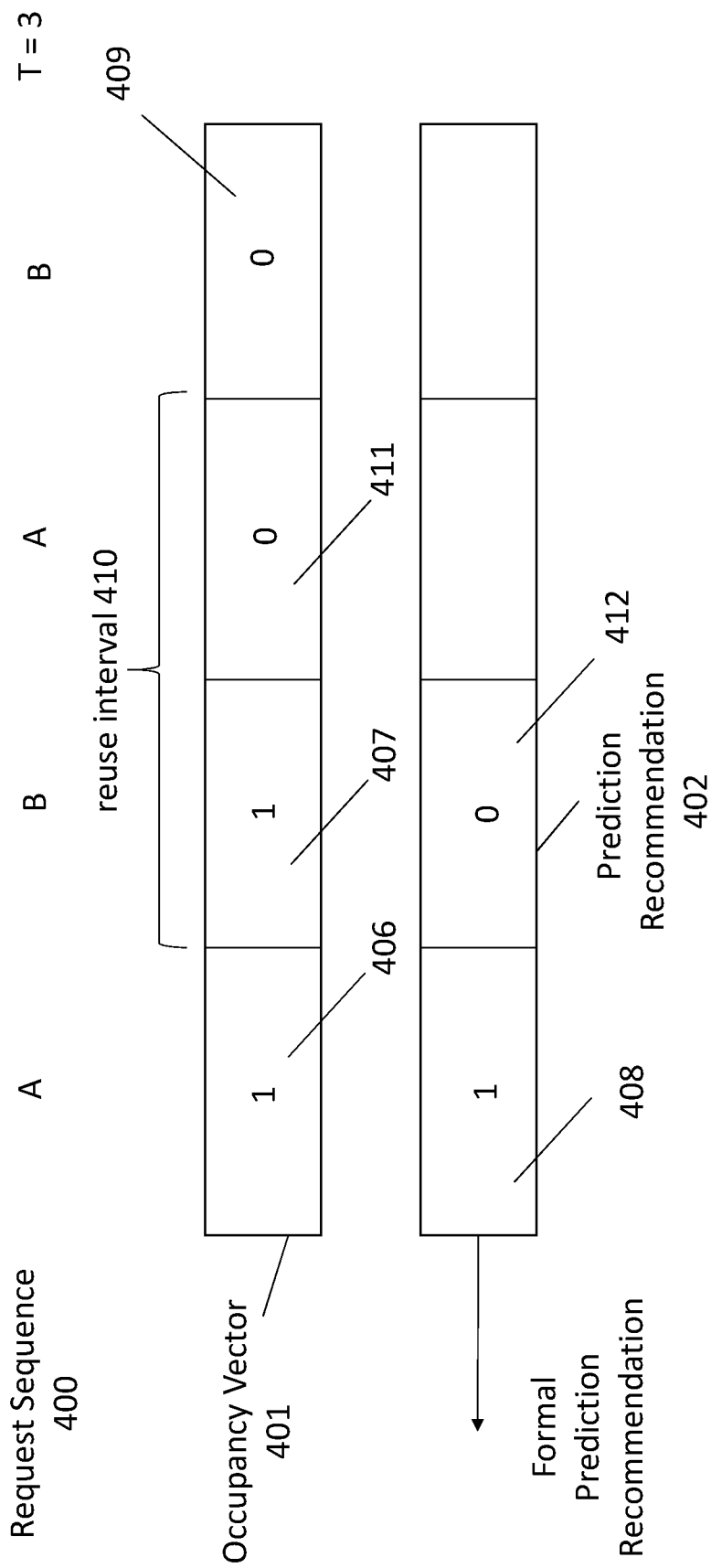
Figure 4G:
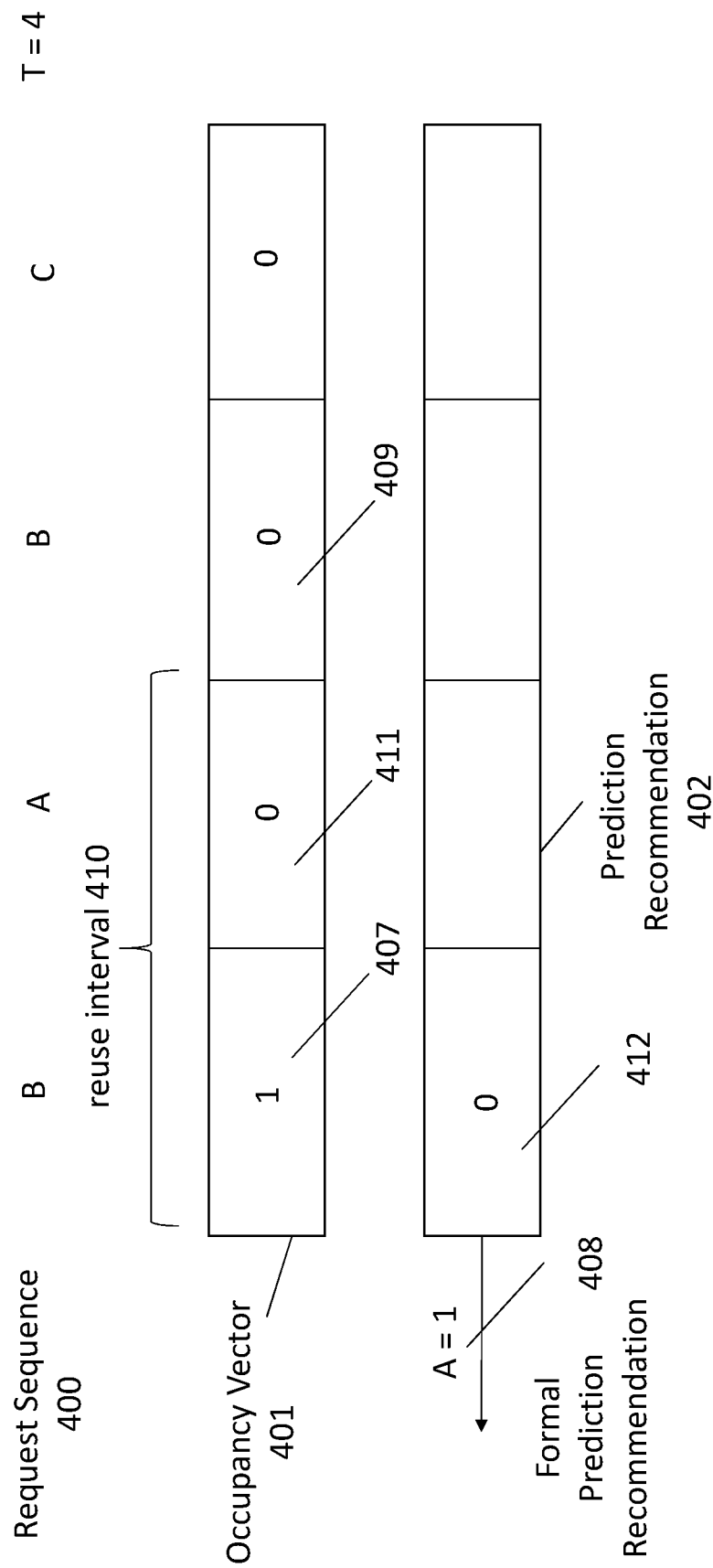
Figure 4H:
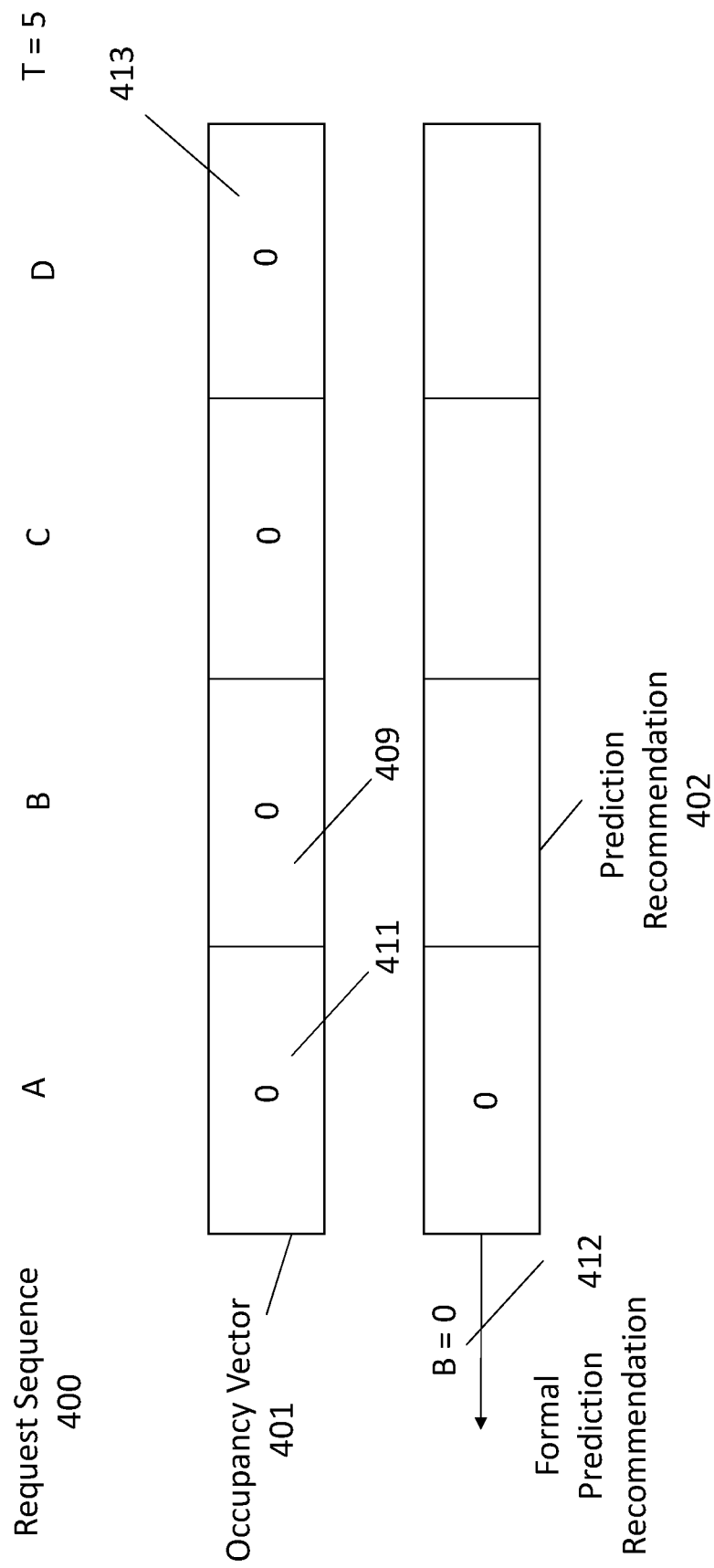

Referring to FIG. 4g, at time T=4, the leftmost bit in the vector state of FIG. 4f (which corresponds to cache line address A) is shifted out along with the prediction logic's recommendation 408 that the cache line having address A should be included in the cache. Similarly, referring to FIG. 4h, at time T=5, the leftmost bit in the vector state of FIG. 4g (which corresponds to cache line address B) will be shifted out along with the prediction logic's recommendation that cache line address B be excluded from the cache.

Figure 5:
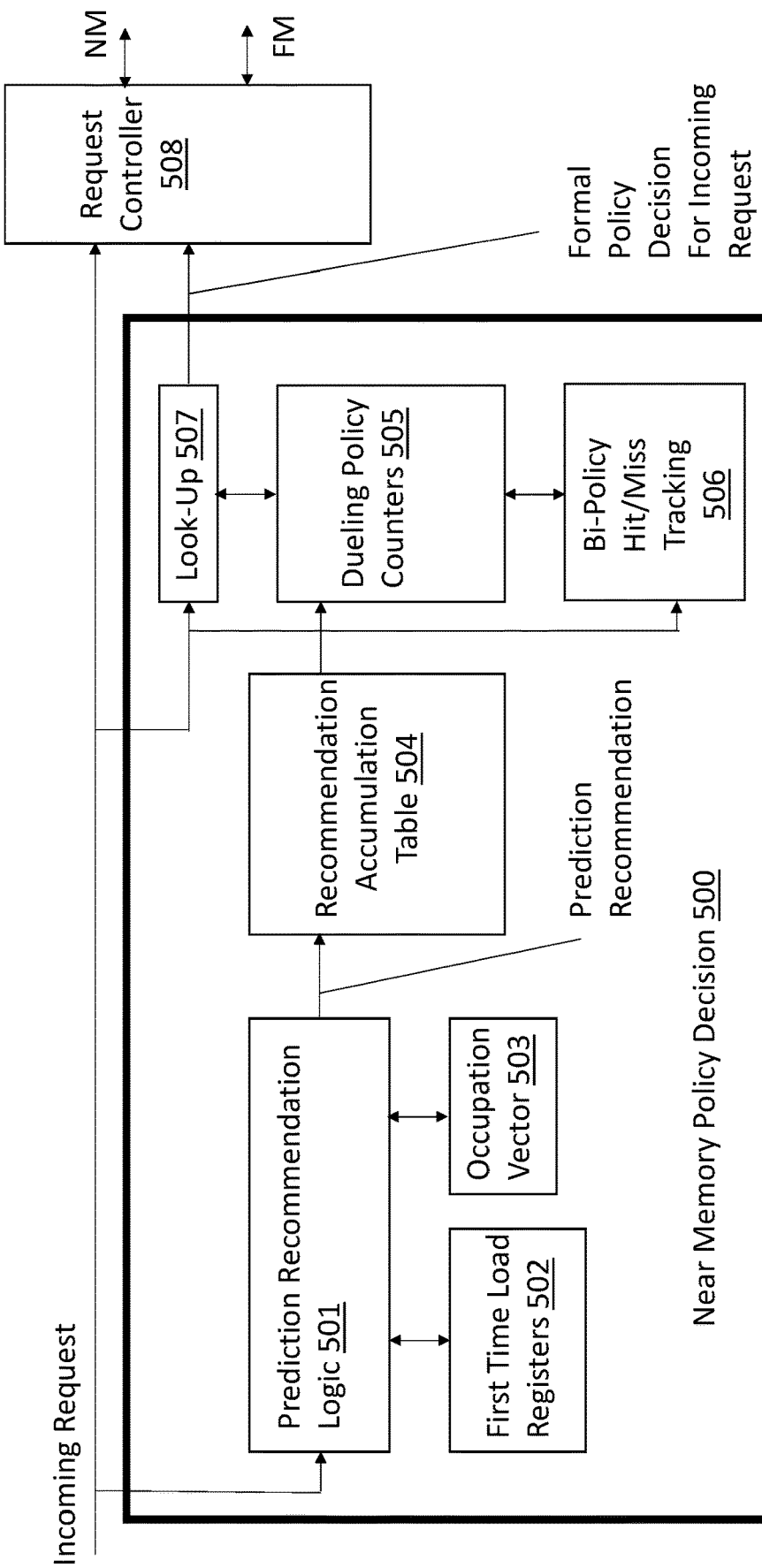
FIG. 5 shows a circuitry for implementing the improved method of FIG. 2 and the prediction methodology of FIG. 3.

FIG. 5 shows an embodiment of near memory policy decision logic circuitry 500 and a request controller 508 that can be used to implement the methodology of FIG. 2. Both circuits may be components of a main memory controller such as controller 116 of FIG. 1. Here, an incoming request is processed to determine a next state of the occupancy vector 503 and any generated recommendation. As discussed in more detail below, recommendations are accumulated in a recommendation accumulation table 504. Also as described below, dueling policy registers 505 provide a final decision as to whether the incoming request should be processed according to the nominal policy in which the most recently targeted cache line is always written to near memory, or, the enhanced policy discussed at length above that attempts to preventing a less frequently used cache line from occupying near memory even if it is the most recently targeted cache line. A final policy decision is then presented to a controller 508 commensurate with the request and the request is handled according to the determined policy.

The prediction recommendation logic 501 implements function 201 of FIG. 2 according, e.g., to the prediction recommendation scheme discussed above with respect to FIGS. 3 and 4a through 4h. Notably, the prediction recommendation logic 501 is coupled to a first time load register 502 and an occupation vector register 503. The first time load register 502 lists the addresses of requests that have been processed up to the current state of the cache line slot that the near memory decision logic is dedicated to (subsequent requests for a same address do not affect the first time load register 502). The occupation vector register 503 was described at length above. In various embodiments, as described in more detail below, either or both of the contents of registers 502, 503 may instead be stored in external memory (e.g., reserved space in near memory) rather than in main memory controller to conserve semiconductor real estate.

The recommendations that flow from the occupation vector 503 are accumulated in table 504 to record the prediction algorithm conclusions for the different cache line addresses that have been directed to the cache line slot that the policy decision circuitry 500 supports. In an embodiment, table 504 includes a separate entry and counter for each system memory address that can map to the particular cache line slot. Each counter value corresponds to an accumulated propensity of the prediction algorithm's recommendation for a particular system memory address.

Here, each time the occupancy vector 503 issues a recommendation for a particular cache line address, the counter for that system memory address is adjusted in the table 504. According to one embodiment, if the occupancy vector 503 recommends inclusion for the address, the address's counter is incremented in the table, or, if the prediction logic recommends exclusion for the address, the address's counter is decremented in the table 504.

As observed in FIG. 5, the determination logic 500 also implements a "dueling algorithm" approach to making a final decision on whether or not a cache line of a particular system memory address should be kept in near memory cache or excluded from it. Here, apart from keeping an accumulated recommendation for each address in table 504 as discussed above, the determination logic 500 also includes hit/miss tracking logic 506 to track near memory cache hit/miss rates for each address for both the nominal policy (in which the most recently requested cache line is always placed in near memory cache) and for the enhanced policy (in which a most recently requested cache line can be excluded from near memory cache based on a prediction algorithm).

Here, the tracking logic 506 calculates hit/miss ratios for both policies irrespective of which policy is enabled for the particular cache line address. That is, each time a request is received for a particular address, the tracking logic 506 determines if a hit or miss would have occurred if the nominal caching policy was in place (which is straightforward to determine, if the immediately preceding request that mapped to the cache line slot had the same address there would be a hit, otherwise there would be a miss). Likewise, the tracking logic 506 determines if a hit or miss would have occurred if the enhanced policy was in place. In this case, the tracking logic 506 looks to the entry in table 504 for the address and, if beneath some threshold, will assume the cache line was excluded from the cache on its immediately previous access request. If the immediately preceding request that mapped to the cache line slot unfortunately included the particular address, a miss is counted for the enhanced algorithm.

Dueling policy counters 505 are then used to make a final determination as to what policy is appropriate for each received request. Here, a separate counter is instantiated for each address that can map to the cache line slot. For each counter/address, each time a miss is determined for the nominal policy, the count value is incremented by one. By contrast, each time a miss is determined for the enhanced policy the count value is decremented by one.

If the counter value rises above some positive preset threshold it signifies that the nominal policy is missing much more frequently than the enhanced policy for the particular address that the counter is associated with. Upon a request being received that maps to the cache line slot and includes the address, the counter value for the request's address will be looked up from the dueling policy counters 505 by way of look-up circuitry 507. If the look-up counter value exceeds the positive threshold, the cache line associated with the request will not be written into near memory by the conclusion of the request's processing. Otherwise, if the counter value is not above the positive threshold, the nominal policy is put in place and the cache line is written into near memory by the conclusion of the request's processing.

Different embodiments can implement different granularities and/or keep prior history data according to different approaches. For instance, at one extreme, one policy decision circuit 500 is instantiated per cache line slot, and, is entirely implemented on a host side (e.g., main) memory controller (e.g., on a multi-core processor having multiple CPUs, main memory controller, peripheral control hub, etc.). In various environments, however, the inclusion of all such logic on the host side memory controller would consume too much semiconductor real estate.

In order to address this challenge, one policy decision circuit 500 is instantiated for multiple cache line slots so there are less policy decision circuits 500 than cache line slots. Here, a subset of system memory address bits that are not-shared across cache line slots are not considered by the prediction scheme (said another way, the prediction scheme only considers system memory address bits that are common across the cache line slots that the policy decision circuit 500 is instantiated on behalf of).

For example, according to one embodiment, higher ordered address bits are used to determine which cache line slot a cache line maps to. These higher ordered bits are therefore not considered by the policy decision circuit 500, which only considers the lower ordered bits that are common to all cache lines in all the cache line slots that the policy decision circuit 500 supports. In this manner, cache lines having different higher ordered bits (which are ignored) but same lower ordered bits (which are considered) are affectively treated as the same cache line by the policy decision circuit 500.

In a same or combined embodiment, the occupancy vector 503 information may be kept as meta data in the cache line itself rather than kept within the host side memory controller. For example, according to various Joint Electron Device Engineering Council (JEDEC) industry standard specifications (e.g., double data rate (DDR) specifications), a cache line not only includes customer data information but also includes space for error correction code (ECC) information.

In various embodiments, the occupancy history for the cache line slot is kept in the ECC space of the cache line that is stored in the cache line slot in, e.g., external dynamic random access memory (DRAM) (e.g., on a dual-in-line-module (DIMM), stacked memory module or other memory module that is coupled to the host side memory controller). Thus for instance, when a cache line is read from the cache line slot, its occupancy vector information is extracted from the cache line, updated and written back in the ECC space of the next cache line to be written into the cache line slot (which may the same or a different cache line than the cache line that was just read from the cache line slot). In cases where only a single prediction logic unit is instantiated for multiple cache line slots, the occupancy vector information contains the combined information for all the cache line slots that are supported by the particular prediction logic unit that monitors/updates the occupancy vector information. The other supported cache lines have their full ECC space (their ECC space is not consumed by occupancy vector information).

Note that, consistent with the discussion of FIG. 2, in various embodiments, only read requests that suffer a cache miss can be affected/impacted by the formal policy decision produced by the near memory policy decision unit 500. As such, for example, a formal policy decision for a request is not generated unless the request is a read request that suffers a cache miss. In various combined or alternate embodiments, all kinds of requests are processed by the near memory policy decision unit 500 (e.g., cache hit requests as well as cache miss requests, and/or write requests as well as read requests). In still other embodiments, the near memory policy decision unit 500 only processes read requests that have suffered a cache miss as its input information.

In still other embodiments, predictions are used for cache hits as well as cache misses. That is, FIG. 2 is altered to invoke a prediction after a cache hit. According to a first such embodiments, when using a prediction after a cache hit, only cache hit read requests utilize a prediction to determined near memory policy. In yet another embodiment, both cache hit read requests and cache hit write requests use a prediction to determine their near memory policy.

Although the embodiments above have been focused on a direct mapped cache solution, in various embodiments, near memory may be implemented as a set associative cache. As is understood in the art, in the case of a set associative cache, the system memory address of a single/same cache line can map to multiple cache line slots. For example, a hashing function may be calculated on the address. The output of the hashing function identifies different blocks or sets of cache line space that the cache line can be entered into. In this case, one prediction unit may be implemented for each of the sets to determine, on a per set basis, which cache lines should be excluded from the set and which cache lines should be included in the set.

This architecture can be implemented in a straightforward fashion consistent with the discussion above of FIGS. 3 and 4a through 4h except that the unit of focus/analysis is a set rather than a singular cache line slot. Occupancy vector information for the set may be kept on the host side memory controller or may be kept in meta data that is kept in reserved system memory address space that is separately accessed each time an update is made to the set's occupancy vector. Note that the maximum capacity value for the elements of the occupancy vector can be enlarged (beyond 1) to reflect the increased number of cache lines slots that are theoretically available to any cache line in the system.

Although the above discussion has consistently referred to a cache line as the basic unit at which data items are read/written from/to memory, other embodiments may access memory in data items other than cache lines specifically.

Figure 6:
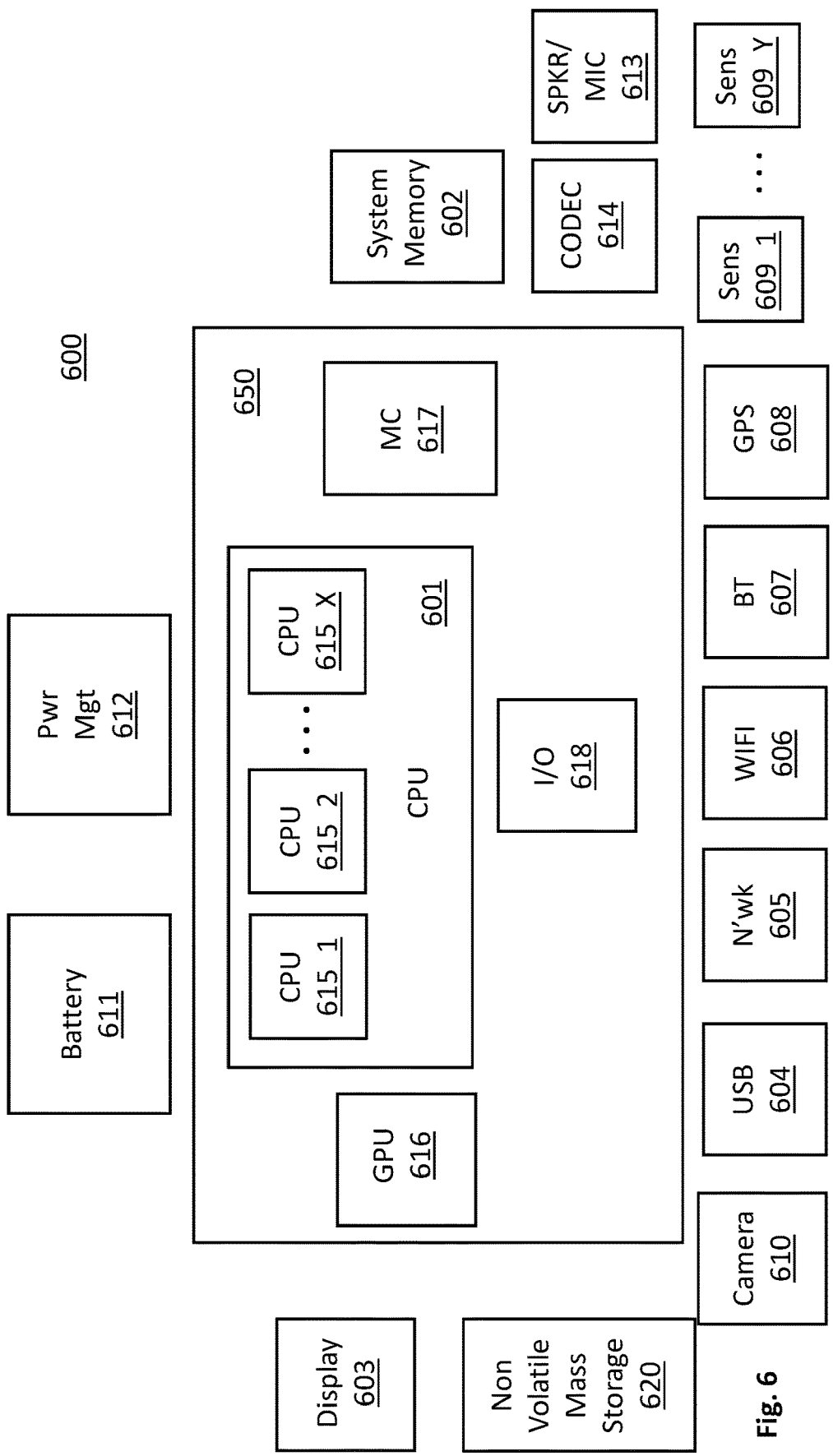
FIG. 6 shows a computing system.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a host side memory controller) and an I/O control function 618. The general purpose processing cores 615 typically execute the system and application software of the computing system. The graphics processing unit 616 typically executes graphics intensive functions to, e.g., generate graphics information that is presented on the display 603.

The memory control function 617 (e.g., main memory controller) interfaces with the system memory 602 to write/read data to/from system memory 602. The system memory may be implemented as a multi-level system memory. The memory controller function may include policy determination circuitry, like that described at length above, that attempts to keep lesser used cache lines that compete for same cache space in a near memory cache from occupying the cache space so that more frequently used cache lines will occupy it.

Each of the touchscreen display 603, the communication interfaces 604-607, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The power management control unit 612 generally controls the power consumption of the system 600.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
memory controller logic circuitry to interface to a multi-level memory comprising a higher memory level to act as a memory side cache for a lower memory level, the memory controller logic circuitry comprising policy determination logic circuitry to prevent lesser accessed data items from occupying space in the higher memory level at the expense of more frequently accessed data items, and wherein, upon a read/write of a lesser accessed data item from/to the lower memory level the lesser accessed data item is not placed in the higher memory level, and wherein, upon a read/write of a more frequently accessed data item from/to the lower memory level the more frequently accessed data item is placed in the higher memory level, wherein the policy determination logic circuitry further comprises prediction logic circuitry, the prediction logic to recommend whether a particular data item should, or should not, be kept in the higher memory level, wherein the prediction logic circuitry is coupled to an occupancy vector circuit that keeps a history of which data items have been most recently accessed, and wherein, the occupancy vector represents a most recently accessed data item with a value that is determined from an amount of space in the higher memory level where the most recently accessed data item can be stored.

2. The apparatus of claim 1 wherein the policy determination logic circuitry further comprises circuitry to accumulate respective recommendations for different data items.

3. The apparatus of claim 1 wherein the prediction logic circuitry is to change values in the occupancy vector based on which data items have been most recently accessed, and where, a particular data item's recommendation is determined from the values in the occupancy vector.

4. The apparatus of claim 1 where the value is one bit and the higher memory level is implemented as a direct mapped cache.

5. A computing system, comprising:
a plurality of processing cores;
a peripheral control hub having an interface to couple to a solid state drive;
a multi-level memory comprising a higher memory level to act as a memory side cache for one or more lower memory levels; and,
memory controller logic circuitry to interface to the multi-level memory, the memory controller logic circuitry comprising policy determination logic circuitry to prevent lesser accessed data items from occupying space in the higher memory level at the expense of more frequently accessed data items, and wherein, upon a read/write of a lesser accessed data item from/to the one or more lower memory levels the lesser accessed data item is not placed in the higher memory level, and wherein, upon a read/write of a more frequently accessed data item from/to the one or more lower memory levels the more frequently accessed data item is placed in the higher memory level, wherein the policy determination logic circuitry further comprises prediction logic circuitry, the prediction logic to recommend whether a particular data item should, or should not, be kept in the higher memory level, wherein the prediction logic circuitry is to maintain an occupancy vector to keep a history of which data items have been most recently accessed, wherein the occupancy vector represents a most recently accessed data item with a value that is determined from an amount of space in the higher level where the most recently accessed data item can be stored.

6. The computing system of claim 5 wherein the policy determination logic circuitry further comprises circuitry to accumulate respective recommendations for different data items.

7. The computing system of claim 5 wherein the prediction logic circuitry is to change values in the occupancy vector based on which data items have been most recently accessed, and where, a particular data item's recommendation is determined from the values in the occupancy vector.

8. The computing system of claim 5 where the value is one bit and the higher memory level is implemented as a direct mapped cache.

9. The computing system of claim 5 wherein the occupancy vector is kept in the higher memory level.

10. The computing system of claim 5 wherein the data items are cache lines.

* * * * *